(12) United States Patent
New (10) Patent No.: US 8,383,326 B2
(45) Date of Patent: *Feb. 26, 2013

(54) OPTICAL DEVICE AND METHOD OF MAKING THE SAME USING COMBINATION OF LIGHT ENERGY SENSITIVE MATERIALS

(75) Inventor: Anthony New, Terre Haute, IN (US)

(73) Assignees: Sony Corporation, Tokyo (JP); Sony DADC US Inc., Terre Haute (IN)

( * ) Notice: Subject to any disclaimer, the term of this patent is extended or adjusted under 35 U.S.C. 154(b) by 982 days.

This patent is subject to a terminal disclaimer.

(21) Appl. No.: 11/716,712

(22) Filed: Mar. 12, 2007

(65) Prior Publication Data

US 2008/0225424 A1 Sep. 18, 2008

(51) Int. Cl.
*G11B 7/24* (2006.01)

(52) U.S. Cl. ....... 430/321; 369/273; 428/64.8; 428/64.6

(58) Field of Classification Search .................. None
See application file for complete search history.

(56) References Cited

U.S. PATENT DOCUMENTS

| | | | | |
|---|---|---|---|---|
| 3,308,732 | A * | 3/1967 | Raak et al. | 396/557 |
| 4,090,031 | A * | 5/1978 | Russell | 369/284 |
| 4,716,289 | A * | 12/1987 | Guerrini et al. | 359/235 |
| 4,954,380 | A * | 9/1990 | Kanome et al. | 428/64.8 |
| 5,447,767 | A * | 9/1995 | Tanabe et al. | 428/64.4 |
| 5,521,900 | A * | 5/1996 | Ando et al. | 369/53.22 |
| 5,619,480 | A * | 4/1997 | Seo et al. | 369/14 |
| 6,279,959 | B1 * | 8/2001 | Nishizawa | 283/67 |
| 7,830,777 | B2 * | 11/2010 | New | 369/273 |
| 2002/0034155 | A1 * | 3/2002 | Usami | 369/286 |
| 2002/0097664 | A1 * | 7/2002 | Ono et al. | 369/273 |
| 2002/0127367 | A1 * | 9/2002 | Shibata | 428/64.4 |
| 2003/0198156 | A1 * | 10/2003 | Kondo | 369/52.1 |
| 2004/0121268 | A1 * | 6/2004 | Conroy et al. | 430/321 |
| 2004/0152013 | A1 * | 8/2004 | Olson et al. | 430/270.11 |

(Continued)

FOREIGN PATENT DOCUMENTS

| | | | |
|---|---|---|---|
| JP | 60-136928 | * | 7/1985 |
| JP | 08-017079 | * | 1/1996 |
| JP | 11-250192 | * | 9/1999 |
| JP | 2001-023343 | * | 1/2001 |

(Continued)

OTHER PUBLICATIONS

"Photoinitiators for UV curing", CIBA product guide (8 pages) (2003).*

*Primary Examiner* — Martin Angebranndt
(74) *Attorney, Agent, or Firm* — Haverstock & Owens LLP (57) ABSTRACT

A method of making optical devices includes applying an energy sensitive protective material and an energy sensitive advanced optical material to a surface. The surface can be on the optical device or on a carrier, such as a thin sheet, to be applied to the optical device. Light energy is applied through a special production filter to cure the energy sensitive protective material on the surface while blocking light energy outside a selected wavelength spectrum from reaching the material. A portion of the optical device can then be masked, and light energy outside the spectrum filtered by the special production filter can be applied to activate the unmasked portion of the advanced optical material. The special production filter allows curing of the protective material using light energy in a limited (e.g., visible) spectrum so that the advanced optical material can be activated using light energy in the ultraviolet spectrum.

18 Claims, 6 Drawing Sheets

U.S. PATENT DOCUMENTS

| | | | |
|---|---|---|---|
| 2006/0227696 A1* | 10/2006 | Smith et al. | 369/275.1 |
| 2006/0239155 A1* | 10/2006 | New et al. | 369/53.1 |
| 2007/0050585 A1* | 3/2007 | New et al. | 711/163 |
| 2007/0114365 A1* | 5/2007 | Potyrailo et al. | 250/221 |
| 2007/0170606 A1* | 7/2007 | New | 264/1.1 |
| 2008/0165669 A1* | 7/2008 | New et al. | 369/275.5 |

FOREIGN PATENT DOCUMENTS

| | | | |
|---|---|---|---|
| JP | 2001-265724 | * | 9/2001 |
| JP | 2004-110933 | * | 4/2004 |
| WO | 99/65696 | * | 12/1999 |

* cited by examiner

OPTICAL DEVICE AND METHOD OF MAKING THE SAME USING COMBINATION OF LIGHT ENERGY SENSITIVE MATERIALS

CROSS REFERENCE TO RELATED APPLICATIONS

This application relates to U.S. application Ser. No. 11/410,478, filed on Apr. 24, 2006, titled "SYSTEM AND METHOD FOR SELECTIVELY ENABLING OR DISABLING AN OPTICAL DEVICE," now U.S. Pat. No. 8,285,481, and U.S. application Ser. No. 11/656,932, filed on Jan. 24, 2007, titled "SYSTEM AND METHOD FOR SELECTIVELY ENABLING OR DISABLING AN OPTICAL DEVICE USING OPTICAL BLOCKING MATERIAL ON AN ENERGY MASKED AREA OF THE OPTICAL DEVICE." now U.S. Pat. No. 7,830,777, These applications are hereby incorporated by reference in their entirety.

BACKGROUND OF THE INVENTION

1. Field of the Invention

The present invention relates generally to methods of manufacturing optical devices, and in particular, to methods of manufacturing optical devices having protective materials that must be cured and advanced optical materials that must be activated.

2. Description of the Related Art

For the purposes of the present discussion, an optical device may be any device or medium that relies on optics to function properly. Examples of optical devices include, but are not limited to, Compact Discs (CDs), Digital Video Discs (DVDs), High Density DVDs (HD-DVDs), Blu-ray discs, and so on.

Systems and methods for selectively activating products are employed in various demanding applications including product theft-prevention, rental-return enforcement, and prevention of copyright infringement. Such applications often demand cost-effective systems that are difficult to circumvent, yet convenient to control with the appropriate equipment.

Systems for selectively activating products are particularly important in theft-prevention applications involving readily shoplifted optical devices, such as CDs and DVDs. Conventionally, such optical devices are tagged with a theft-prevention device, such as a sticker or a Radio Frequency Identification Tag (RFID) that is deactivated upon purchase. When deactivated, the devices prevent alarm-triggering tag functions from triggering alarms when a customer exits a merchandise outlet, such as a retail store.

Unfortunately, thieves often readily notice and remove such tags. Furthermore, RFID tags may undesirably increase product costs and may further emit undesirable radio frequencies even after deactivation. For example, such frequencies may not be approved by the Federal Aviation Administration (FAA) for in-flight use.

The related patent applications cited above describe systems for selectively enabling and disabling optical devices. In the latter application, the optical blocking materials are applied to the readable surface of the optical device during production, and are then activated by applying sufficient energy to change the optical blocking material from a non-transparent condition into a transparent condition. The optical blocking material can then be masked and partially activated during production to reduce the energy required to fully activate the optical device later in retail or other supply chain settings.

Low cost, scratch resistant lacquer or film-based materials can be used as a platform to deliver functional materials to optical-based products, such as optical discs. Ultraviolet (UV) light is generally used to manufacture these products. The requirement for UV light in the manufacturing and printing process forces other wavelengths of light to be used for additional advanced optically sensitive materials. This leaves only the visible and infrared spectrums for activating optically activated materials, allowing reading, data storage and/or security activation. Generally, the infrared spectrum does not produce enough energy to rapidly activate optically sensitive materials. This leaves only the UV and visible spectrums to drive photonic reactions during manufacturing and product activation processes. Currently the UV spectrum is set aside in manufacturing for curing, coating and printing of optical components. Therefore, this leaves only the visible spectrum (400 to 750 nm wavelength) for the function and/or activation of optically activated materials. Unfortunately, the visible spectrum cannot be used for products that might be activated or are intended to function in light emitting devices like a CD or DVD player. Furthermore, materials that can be activated in the visible spectrum are often susceptible to sunlight damage.

SUMMARY OF THE INVENTION

The present invention accommodates using a combination of energy sensitive materials during production of an optical device, with a first energy sensitive protective layer cured by applying light energy in a first filtered spectrum, and a second energy sensitive advanced optical material activated by applying light energy in a spectrum outside the first filtered spectrum.

In one embodiment, a method of making optical devices includes applying an energy sensitive protective material and an energy sensitive advanced optical material to a surface. The surface can, for example, be on the optical device itself or on a carrier, such as a thin sheet, to be applied to the optical device in a later production process. Light energy is applied to the energy sensitive materials through a special production filter to cure the protective material while blocking light energy that would activate the advanced optical material. A portion of the optical device can then be masked, and light energy sufficient to activate the advanced optical material is applied to the unmasked portion of the advanced optical material. This method of using a special production filter allows curing of the protective material using light energy in a limited spectrum (e.g., the visible spectrum and/or part of the ultraviolet spectrum) so that the advanced optical material can be activated efficiently and reliably in a later process step using light energy in another spectrum (e.g., the ultraviolet spectrum).

According to one aspect, the present invention provides a method of manufacturing an optical device, comprising: applying first and second energy sensitive materials having different properties to a surface; and applying a first energy through a first filter to cure the first energy sensitive material while blocking energy that would activate the second energy sensitive material.

According to another aspect, the present invention provides a method of manufacturing an optical device, comprising: applying first and second energy sensitive materials having different properties to a surface; applying a first energy through a first filter to cure the first energy sensitive material while blocking energy that would activate the second energy sensitive material, the first filter transmitting light energy in a first range of wavelengths while blocking light energy at wavelengths outside the first range of wavelengths; and applying a second energy to activate the second energy sensitive material, the second energy comprising light energy at wavelengths below the first range of wavelengths.

According to another aspect, the present invention provides an optical device, comprising: a first energy sensitive material that has been cured to form a protective layer by application of a first light energy within a first range of wavelengths; and a second energy sensitive material that can be activated by application of a second light energy within a second range of wavelengths and that is not activated by light energy in the first range of wavelengths, the second range comprising wavelengths below the first range of wavelengths.

The present invention can be embodied in various forms, including business processes, computer implemented methods, computer program products, computer systems and networks, user interfaces, application programming interfaces, and the like.

BRIEF DESCRIPTION OF THE DRAWINGS

These and other more detailed and specific features of one or more embodiments of the present invention are more fully disclosed in the following specification, reference being had to the accompanying drawings, in which.

DETAILED DESCRIPTION OF THE INVENTION

In the following description, for purposes of explanation, numerous details are set forth, such as flowcharts and system configurations, in order to provide an understanding of one or more embodiments of the present invention. However, it is and will be apparent to one skilled in the art that these specific details are not required in order to practice the present invention.

An optical device may be any device or medium that employs optical energy to function as desired. An optical device may include any optical disc employed to store, provide, and/or manipulate data using selective application of optical energy. An optical device may employ a beam of optical energy for reading and/or writing data to/from the optical device. Examples of optical devices include, but are not limited to, CCD chips, Compact Discs (CDs), CD Recordable (CDR) media, CD Read/Write (CDRW) media, Blu-ray Discs, High-Density (HD) discs, Digital Video Discs (DVDs), optical memory cards, credit cards, Subscriber Identity Module (SIM) cards, holographic-based storage devices, and any photon to electron transfer device.

Figure 1:
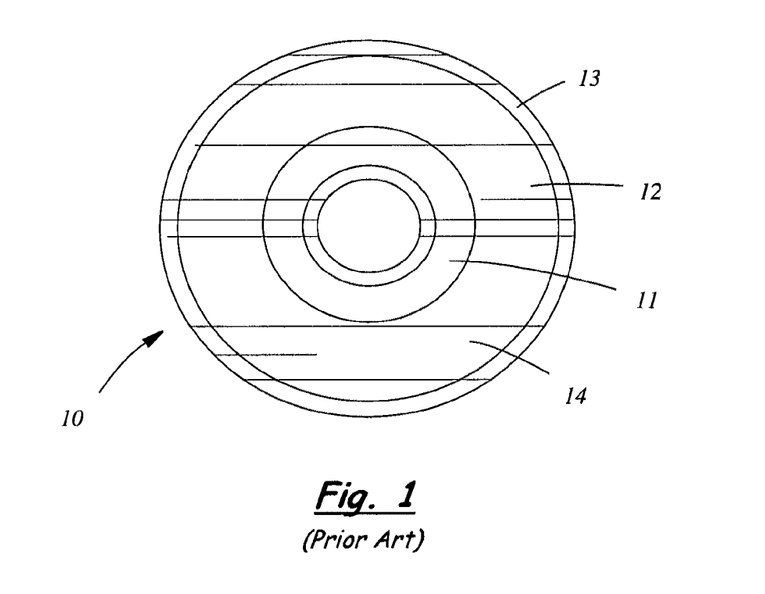
FIG. 1 illustrates an optical disc covered with a protective material coating during a conventional manufacturing process.

FIG. 1 illustrates a conventional optical device 10, such as an optical disc. The optical device 10 includes a spiral track, which is strategically pitted to encode information that is readable by an optical read system (not shown). The optical read system produces a laser beam, which reflects off of patterned pits included in the spiral track on the optical device 10. The pattern of reflected light may be employed by the optical read system or an accompanying computer to decode information encoded on the optical device 10 via the pits.

The conventional optical device 10 illustrated in FIG. 1 has a lead-in area 11 containing the table of contents for the device, a program area 12 containing individual tracks with blocks of data, and a lead-out area 13. The lead-in area 11 must be accessible on the device 10 to enable functional play. If the lead-in area 11 is not visible or is corrupted or partially blocked, the device 10 becomes unplayable. Unplayability can also be accomplished by blocking access to other parts of the optical device 10.

Figure 2:
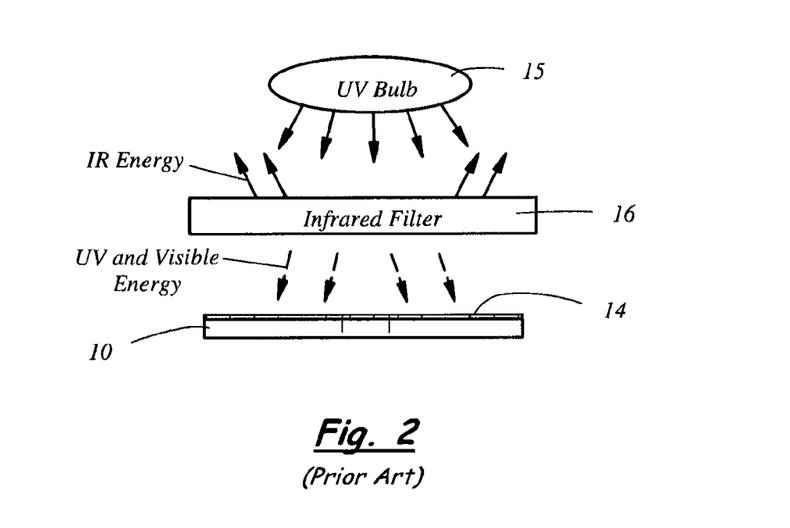
FIG. 2 illustrates a conventional process for curing a protective coating on the optical disc by passing light energy through an infrared filter that transmits ultraviolet and visible light energy to the optical disc while blocking infrared light energy.

The conventional optical device 10 in FIG. 1 is coated by a scratch resistant protective material 14 during the conventional manufacturing process. The protective material 14 is typically a light energy sensitive lacquer material applied by a spin coating process so that it forms a thin coating over the read/write surface of the optical device 10. After the protective material 14 is spin coated onto the optical device 10, the device undergoes a protective material curing process, as illustrated in FIG. 2. In this curing process, light energy from a light source 15 (e.g., a UV lamp) is applied to cure the protective material 14. An infrared filter 16 blocks infrared (heat) energy emitted from the light source 15 from passing to the optical device 10 to reduce disc skew. The UV and visible light energy that passes through the filter 16 polymerizes the protective material 14 and causes it to cure and/or harden in a known manner.

In one embodiment of the present invention, an optical device 20 is coated with an advanced optical material 21 and a protective material 22. The advanced optical material 21 can be applied to the surface of the optical device 20 and then covered with a protective material 22, or the advanced optical material 21 can be mixed with the protective material 22 and applied as one combined material. The advanced optical material 21 and protective material 22 can also be applied to a thin optically transparent sheet that is applied to the optical device 20 after curing, as explained below in connection with another embodiment illustrated in FIGS. 8 to 10. In all of these embodiments, the advanced optical material 21 is engineered with a composition that is only activated by energy in a specific wavelength range. For example, the advanced optical material 21 can be engineered to be sensitive only to UV light energy below 300 nm.

Figure 3:
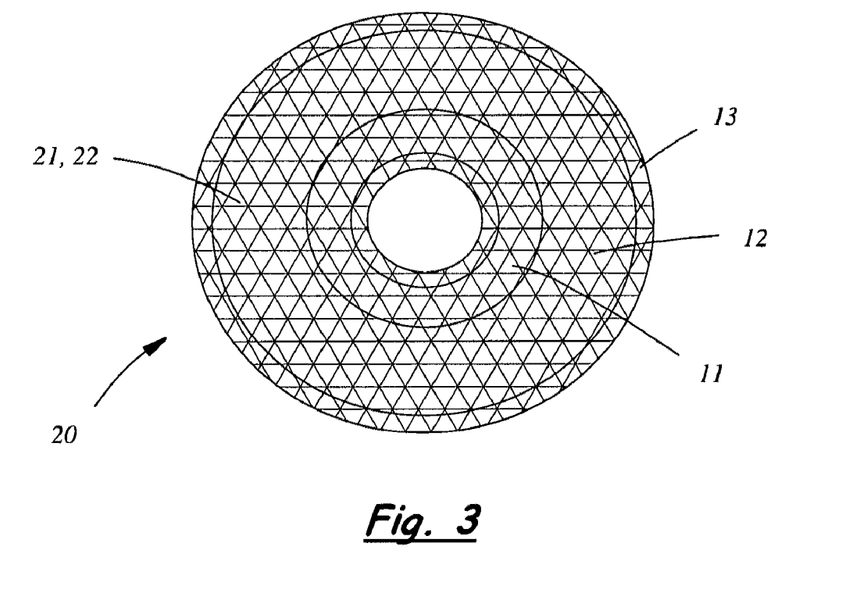
FIG. 3 illustrates an optical disc covered with a protective material and an advanced optical material during a manufacturing process according to the present invention.

The advanced optical material 21 can be an optical blocking material used to selectively enable and disable the optical device 20. As illustrated in FIG. 3, the advanced optical material 21 is applied to an entire surface of the optical device 20 using a spin coating process or other suitable technique. As described in related application Ser. No. 11/410,478, the advanced optical material 21 can be applied over or under the protective material layer 22 or incorporated into the protective material layer 22. The advanced optical material 21 can thus be integrated into the optical device 20 in a variety of ways.

In the spin coating process, the advanced optical material 21 can be combined with the protective material 22 and sprayed or poured onto the surface of the optical device 20. The optical device 20 is then rotated at a high speed to spread the material by centrifugal force. Rotation is continued while the excess material and fluid spins off the edges of the substrate, until the desired thickness of the combined material is achieved on the surface of the optical device 20. The thickness of the protective material 22 and the advanced optical material 21 can be controlled in a known manner by changing the rotation speed, rotation duration, and/or concentration of the solution and solvent. Current spin-coating equipment used in the manufacture of optical discs can be used to apply the advanced optical material 21 and/or the protective material 22.

The advanced optical material 21 can be a photosensitive ink or dye and may be any ink or dye or other material that changes color or transparency in response to application of a specific energy. For example, the advanced optical material 21 can be an optical blocking material that can be applied in a thin layer, which changes nature, such as color or transparency, in response to application of a specific energy, such as optical energy, vibrational energy, or acoustic energy. Optical energy may be any energy within a portion of the electromagnetic spectrum between and including ultraviolet and radio frequencies. In other embodiments, energy other than optical energy may be employed to selectively change the transmissive properties of the advanced optical material 21.

The advanced optical material 21 can comprise various types of ink, azo ink, or ink made by Veriloc, Inc. without departing from the scope of the present invention. Other suitable inks include readily available CD-R and DVD-R recording dyes, including cyanine and phthalocyanine azo dyes, which are reactive to ultrasonic degradation in addition to optical degradation at specific wavelengths and intensities. Exemplary dies also include various types of recording dyes used for Write Once Read Many (WORM) discs, and so on. Such dyes are relatively inexpensive and have characteristics that are suitable for use with embodiments of the present invention.

In one exemplary embodiment, the advanced optical material 21 is an optical blocking material that changes from an initial non-transparent condition into a transparent condition upon activation. As used in the present application, the terms "transparent" and "non-transparent" are used to describe the relative transmissive properties of the advanced optical material 21 in this embodiment in its activated and unactivated conditions. The term "non-transparent" refers to any condition of the advanced optical material 21 that prevents the optical device 20 from being read or written to by an optical read system, even if such condition has some limited transparency (i.e., less transparency than the activated condition of the advanced optical material 21, but not completely opaque).

The term "non-transparent" also includes a condition of the advanced optical material 21 being partially reflective or exhibiting a specific color that prevents an optical read system from reading the optical device 20. The term "transparent" refers to the advanced optical material 21 being sufficiently transparent or non-reflective to enable an optical read system to read the optical device 20.

Figure 4:
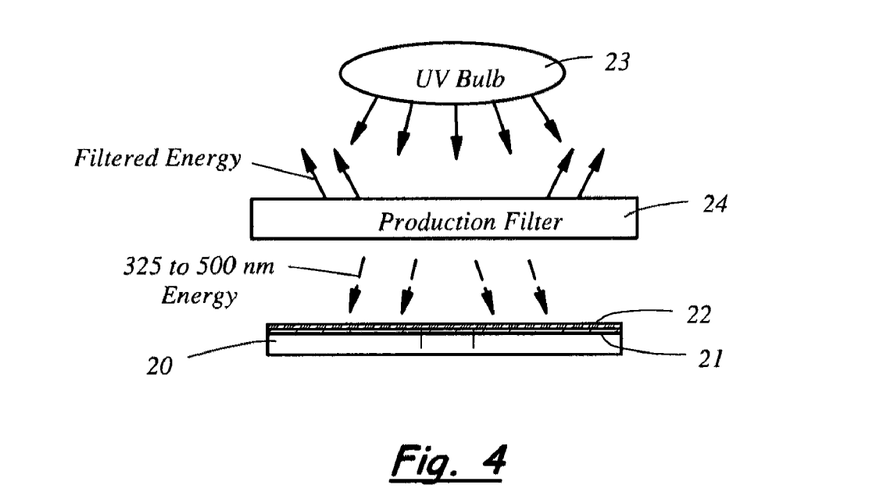
FIG. 4 illustrates a process step for curing the protective material on the optical disc by passing light energy through a special production filter that transmits only a limited spectrum of light to the optical disc while blocking light energy outside of the limited spectrum.

Once the protective material 22 and the advanced optical material 21 are applied to the optical device 20, the device 20 undergoes a protective material curing process, as illustrated in FIG. 4. In this curing process, light energy from a light source 23 (e.g., a UV lamp) is applied to cure the protective material 22. A special production filter 24 blocks light energy outside a predetermined wavelength range from passing to the optical device 20. In one exemplary embodiment, the production filter 24 transmits light energy in the wavelength range of 325 to 500 nm, while blocking light energy having wavelengths outside (i.e., above and/or below) that range. Thus, for example, the production filter 24 blocks infrared light energy to reduce heat on the surface of the optical device 20' that might lead to disc skew, and/or blocks UV light energy in wavelengths below a predetermined lower limit. The UV and visible light energy that passes through the special production filter 24 cures and/or hardens the protective material 22. The production filter 24 can be made, for example, of heat resistant glass that incorporates one or more band pass cut off filters to limit light transmission to within the desired wavelength range.

Figure 5:
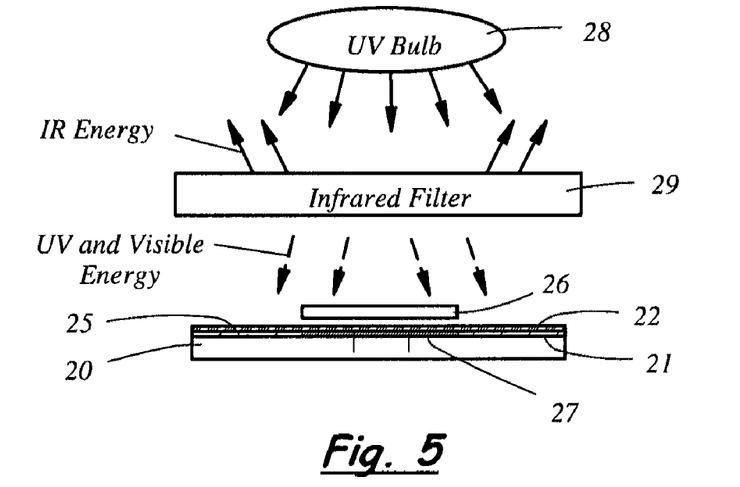
FIG. 5 illustrates a process step for activating an unmasked portion of the advanced optical material on the optical disc by passing light energy through an infrared filter that transmits ultraviolet and visible light energy to the optical disc while blocking infrared light energy.

Once the protective material 22 is cured by the process illustrated in FIG. 4, then the advanced optical material 21 can be activated later in the manufacturing process and/or before purchase by a consumer at a retail location. FIG. 5 illustrates a subsequent process step for activating a selected area 25 of the advanced optical material 21. In this process step, a mask 26 is used to cover part of the optical device 20. The masked area 27 can be, for example, an area of the optical device 20 that is necessary to enable functional play or another particular function of the optical device 20. For example, the lead-in area 11, the file system's volume descriptor data, path tables, directory records, or file descriptors on the optical device 20 can be masked, while leaving the remaining area 25 of the optical device 20 unmasked.

A sufficient energy is then applied to the unmasked area 25 of the optical device 20 to activate that portion of the advanced optical material 21 while leaving the area 27 under the mask 26 unactivated. In this activating process, light energy from a light source 28 (e.g., a UV lamp) is applied to activate the advanced optical material 21. A standard infrared filter 29 blocks infrared light energy from passing to the optical device 20 to reduce heat on the surface of the optical device 20 that might lead to disc skew. The infrared filter 29 transmits both visible and UV light energy, including UV light energy in the wavelength range below the range transmitted by the special production filter 24 in FIG. 4. Thus, the infrared filter 29 transmits UV light energy in wavelengths (e.g., less than 300 nm) necessary to activate the advanced optical material 21.

In the specific embodiment described herein, the advanced optical material 21 is a photosensitive dye that has a non-transparent condition until the material is activated by light energy having a particular wavelength or range of wavelengths, at which time the material becomes transparent. The specific energy necessary to activate the advanced optical material 21 will be determined based on the particular type of advanced optical material used, which will determine the specific parameters of the special production filter 24. For example, ultraviolet light, infrared energy, ultrasonic energy, or vibrational energy can be used to activate certain types of advanced optical materials 21.

Figure 6:
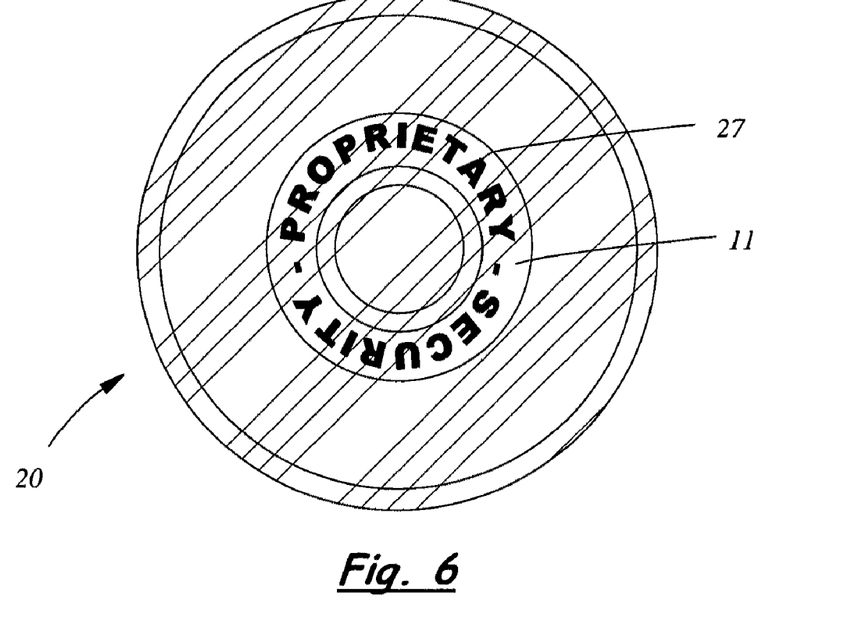
FIG. 6 illustrates an optical disc after the protective material has been cured and the unmasked portion of the advanced optical material has been activated.

As illustrated by FIG. 6, an optical device 20 having an unactivated area 27 of advanced optical material 21 in a pattern of text can be formed by using a mask 26 having the text pattern. For example, the mask 26 can be a circular or ring-shaped adhesive label made of transparent material with printed text thereon. The printed text of the mask 26 will block the light energy from the light source 28 from activating the advanced optical material 21 beneath the mask 26, while the transparent material of the adhesive label will allow the advanced optical material 21 in the area 25 surrounding the text to be activated. The text pattern 27 created by the mask 26 can be made sufficient to stop functional play of the optical device 20, while reducing the amount of material that must be activated later to enable the optical device 20. The smaller or "special" pattern of the unactivated area 27 can be important for downstream activation (i.e., to reduce time to activate, reduce coverage of the device for exposure area, and so forth). For another example, the mask 26 can be a reusable tooling component that is placed over the optical device 20 while energy is applied to the unmasked area 25 of the optical device 20. An activation system at a retail store or other supply chain location will be used to activate the remaining area 27 of advanced optical material 21 on the optical device 20 to enable functional play. Once the area 27 is activated, the optical device 20 can then be used in a normal manner.

Various embodiments of the present invention may provide important capabilities and features for merchants of various optical products, such as CDs and DVDs. Such capabilities and features include: simple and reliable one-time activation at the point of sale; extended exposure to direct sunlight will not activate the optical device; activation time of 1 to 3 seconds at the point of sale can be achieved; activation is possible by passing light through the product packaging, including product cases; the activation system is difficult to reverse engineer; the system can be implemented cost effectively; and the process will not degrade the long term performance of the optical device.

Those skilled in the art may construct advanced optical materials and associated activation equipment to selectively alter the chemistry of the materials to affect transparency or other activation features without undue experimentation. Additionally, conventional systems for inducing changes in material chemistry may be adapted for use with embodiments of the present invention without departing from the scope thereof.

Figure 7:
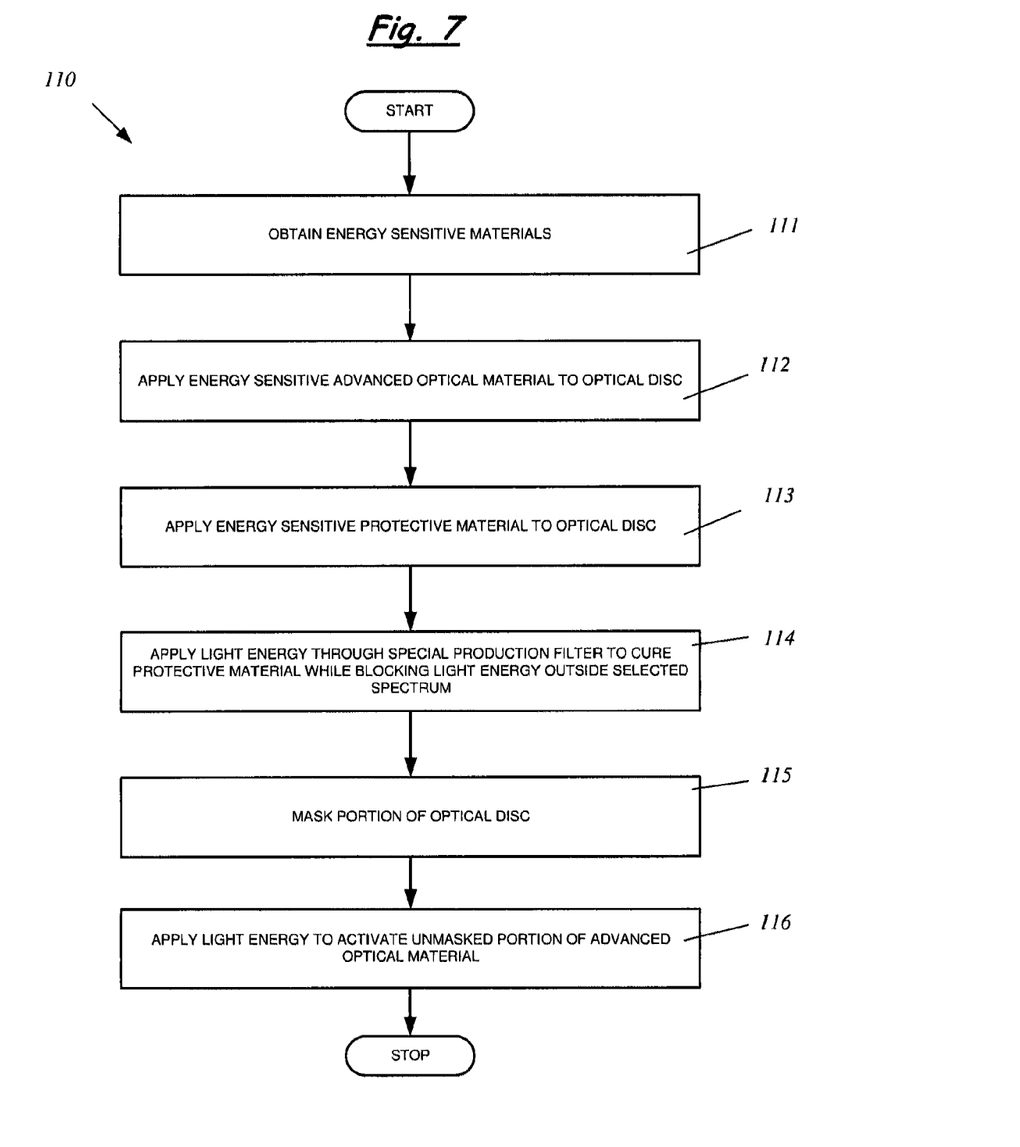
FIG. 7 is a flowchart of the production process steps for manufacturing an optical disc using a special production filter according to the present invention.

FIG. 7 is a flow diagram of a method 110 adapted for use with the embodiments of FIGS. 3 to 6. The method 110 includes an initial material-obtaining step 111, which involves obtaining a protective material and an advanced optical material suitable for use with the present invention. The protective material can be, for example, a lacquer that can be cured into a hard protective layer on the optical device using light energy in the visible wavelength portion of the electromagnetic spectrum. The advanced optical material can be, for example, an optical blocking material that changes transparency in response to a specific frequency and amplitude of optical energy. In the embodiment described herein, the advanced optical material is an optical blocking material that exhibits an initial non-transparent state and can be activated into a transparent state using light energy in the UV wavelength portion of the electromagnetic spectrum.

A subsequent applying step 112 includes applying the advanced optical material to a surface or layer of an optical device 20, such as a read/write surface, through which light must pass to enable effective operation of the optical device 20. The advanced optical material 20 is applied in thick enough layers and/or in sufficient concentrations to disable operation of the device 20.

Another applying step 113 includes applying the protective material to the surface or layer of the optical disc 20. As explained above, the protective material can be applied over the advanced optical material, or it can be mixed together with the advanced optical material and applied together as a combined material. In this case, steps 112 and 113 can be performed together.

After the advanced optical material and protective material are applied to the optical device 20, light energy is applied in step 114 through the special production filter 24. The special production filter 24 transmits light energy sufficient to cure the protective material while blocking light energy that would activate the advanced optical material. This step 114 corresponds with the process illustrated in FIG. 4 of the drawings.

A masking step 115 is then performed by placing a mask 26 over an area 27 of the advanced optical material 21 that will prevent a function of the optical device 20. In a specific embodiment, the mask 26 is placed over the advanced optical material 21 covering at least a portion of the lead-in area 11 of the optical device 20 to prevent functional play of the optical device 20.

An energy applying step 116 is then performed by applying a specific type of energy to the unmasked area 25 of the advanced optical material 21. The energy is selected and applied at a sufficient intensity and duration to make the unmasked area 25 of the advanced optical material 21 change from a non-transparent condition into a transparent condition. The energy applied in this step corresponds with energy that was blocked by the special production filter 24 in step 114. This step 116 corresponds with the process illustrated in FIG. 5 of the drawings.

The mask 26 is then removed, and the optical device 20 can be packaged and delivered to a retail store or other supply chain location, as described in the related applications. The portion 27 of the advanced optical material 21 that was masked during the energy application in step 116 remains in a non-transparent condition at this time so that the optical device 20 is disabled and less likely to be stolen or used before being properly purchased at the retail location. The optical device 20 can be activated as needed at the retail location by applying a specific type of energy to the remaining advanced optical material 27 that was masked during the earlier energy application step 116 in the production process.

Figure 8:
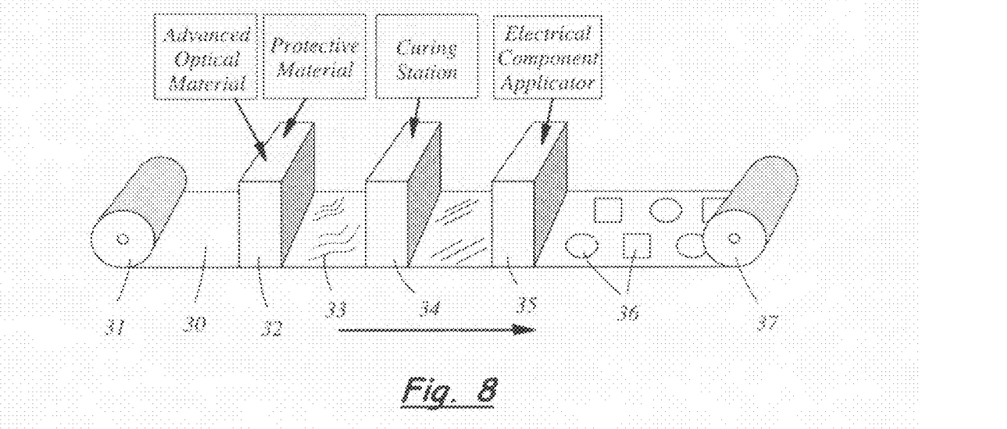
FIG. 8 illustrates a production process for making a thin sheet as the carrier for the protective material and the advanced optical material, with electrical components also applied to the thin sheet.
Figure 9:
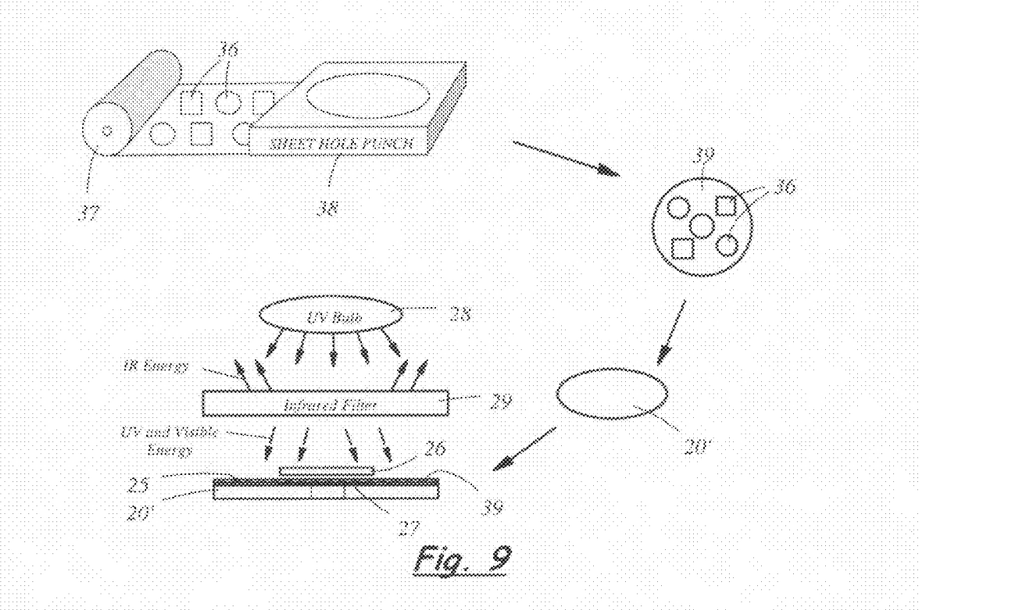
FIG. 9 illustrates a production process for punching disc-shaped elements from the thin sheet, applying the disc-shaped elements to an optical disc, and then activating an unmasked portion of the advanced optical material.

FIGS. 8 and 9 illustrate a production process according to another embodiment of the present invention. In this embodiment, a thin sheet 30 is used as the carrier for the protective material and the advanced optical material. The thin sheet 30 is unrolled from a spool 31 of transparent bulk sheet material and coated with the other materials described herein. As illustrated in FIG. 8, a first material applicator 32 is used to apply a layer 33 of an advanced optical material and a protective material to the thin sheet 30. A curing station 34 with a special production filter incorporated therein is then used to cure the protective material on the thin sheet 30.

An electrical component applicator 35 is then used to apply electro-optic components 36 to the thin sheet 30. The electro-optic components 36 can be, for example, tiny devices used to authenticate, store information and/or interact with disc playback/writing hardware. The thin sheet 30 with the layer 33 of advanced optical material and protective material and the electro-optic components 36 carried thereon is then rewound onto a take-up spool 37. The order of application of the materials and/or components to the thin sheet 30 can be varied to suit specific needs. Also, it should be noted that the manufacturing process for the thin sheet 30 containing additional materials and/or components can be performed away from and off-line of other portions of the optical device manufacturing process.

To avoid inadvertent sunlight activation and/or damage caused by prolonged exposure to sunlight, the advanced optical material and the electro-optic components 36 can be made so that they are only activated at wavelengths outside the visible portion of the electromagnetic spectrum (e.g., 350 to 850 nm). For example, the advanced optical material and the electro-optic components 36 can be designed for activation by UV light below about 300 nm.

FIG. 9 illustrates a subsequent part of the production process in which the bulk sheet 30 is unwound from the spool 37 and a sheet hole punch 38 is used to punch disc-shaped elements 39 from the sheet 30. The disc-shaped elements 39 are then applied to an optical disc 20' in a replication process. The application method can be, for example, the same as used in a typical Blu-ray disc manufacturing process. The advanced optical material can then be partially covered with a mask 26, and the unmasked portion 25 activated using a light source 28 and filter 29 at a downstream process similar to that described above in connection with FIG. 5.

Figure 10:
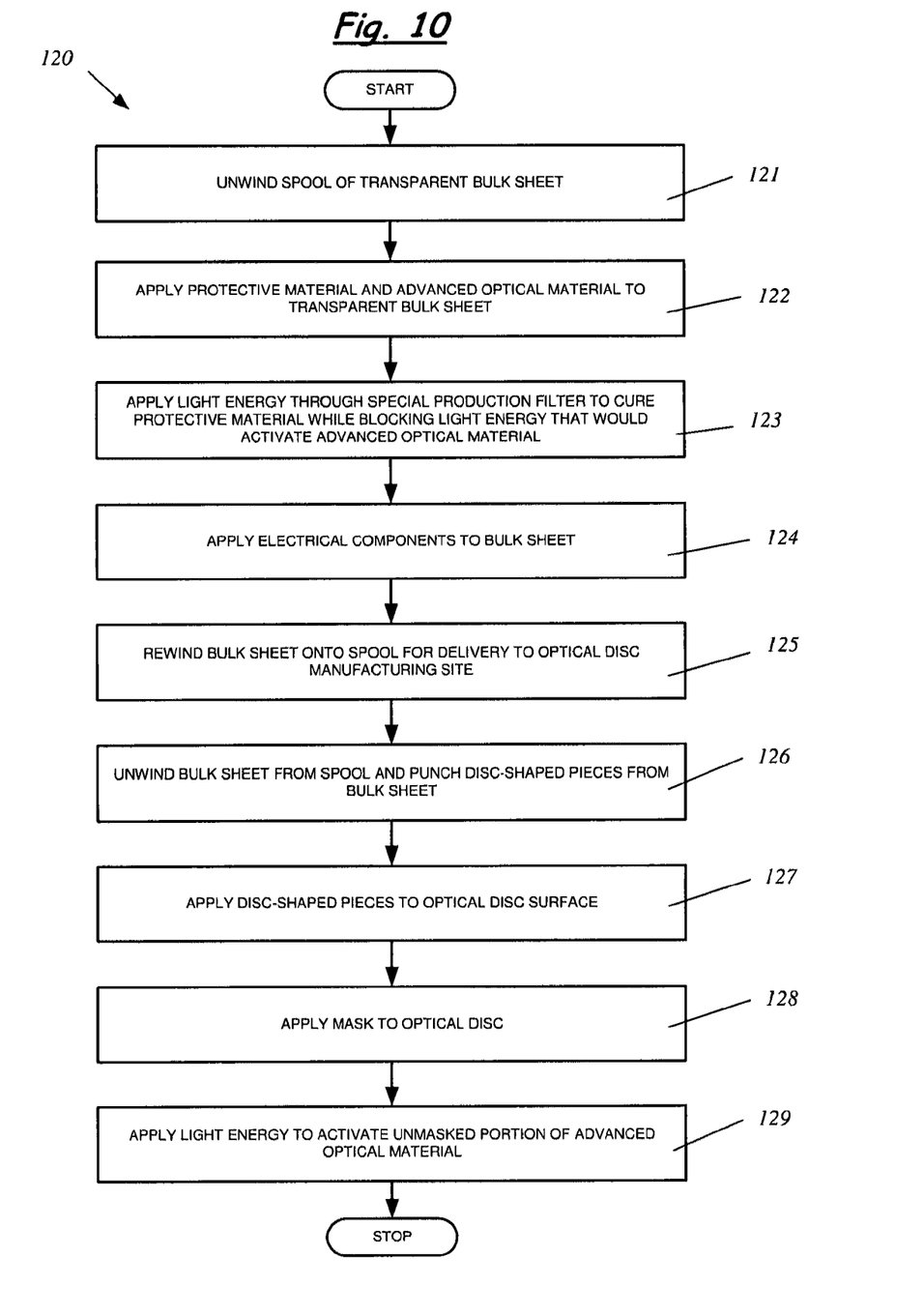
FIG. 10 is a flowchart of the production process steps for manufacturing an optical disc according to the production process illustrated in FIGS. 8 and 9.

FIG. 10 is a flowchart of the process steps for manufacturing an optical disc 20' according to the production process illustrated in FIGS. 8 and 9. The process 120 includes an initial step 121 of unwinding a spool 31 of transparent bulk sheet material 30. An advanced optical material and protective material are then applied to the bulk sheet 30 in step 122. Light energy is applied through the special production filter in step 123 to cure the protective material while blocking light energy outside the wavelength spectrum that would activate the advanced optical material. Electrical components 36, such as printed circuits, are then applied to the bulk sheet 30 in step 124. The bulk sheet 30 is then rewound onto a take-up spool 37 in step 125 for delivery to an optical disc manufacturing site.

At the optical disc manufacturing site, the bulk sheet 30 is unwound from the spool 37 and disc-shaped pieces 39 are then punched from the bulk sheet 30 in step 126. The disc-shaped pieces 39 are applied to a surface of the optical disc 20' in step 127. A mask 26 can then be placed over the optical disc 20' in step 128, and light energy applied in step 129 to activate the unmasked portion 25 of the advanced optical material.

The present invention provides a method to wavelength select at each manufacturing step to protect electro-optical materials at current, low cost production rates. For example, the present invention allows manufacturing processes to take place using light energy in the visible spectrum, and functional activation/reading to take place using light energy in the UV spectrum to avoid sunlight activation/influences. The present invention provides a manufacturing method that can be used to isolate and safeguard the optical energy range associated with additional advanced optically sensitive materials.

While embodiments herein are discussed primarily with respect to one-time activation of an optical disc at a point of sale to prevent or thwart theft of the optical device, the invention is not limited thereto. For example, different materials or combinations thereof may be employed to enable multiple state changes for a given energy-sensitive layer, thereby allowing multiple activations and deactivations of an optical device. Multiple activations and deactivations may be particularly important in rental applications, such as movie rentals, where optical devices may need repeated activation and deactivation.

Although embodiments of the invention are discussed primarily with respect to systems and methods for inhibiting theft of an optical device 20, 20' by selectively enabling the optical device 20, 20' after purchase, other uses and features are possible. Various embodiments discussed herein are merely illustrative, and not restrictive, of the invention. For example, energy-sensitive inks in accordance with the present teachings may be employed to thwart copyright infringement, and to produce optical-based identity and banking products.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically illustrated or described in detail to avoid obscuring aspects of embodiments of the present invention.

The embodiments of the present invention produce and provide systems and methods for manufacturing optical devices using a combination of energy sensitive materials. Although the present invention has been described in considerable detail with reference to certain embodiments thereof, the invention may be variously embodied without departing from the spirit or scope of the invention. Therefore, the following claims should not be limited to the description of the embodiments contained herein in any way.

The invention claimed is:

1. A method of manufacturing an optical storage device that can be incrementally activated, the method comprising:
    applying first and second light energy sensitive materials having different properties to a surface of the optical storage device;
    applying a first light energy through a first filter to cure the first energy sensitive material while blocking light energy that would activate the second energy sensitive material;
    masking with a mask bearing a textual masking pattern at least portions of a selected area of said second energy sensitive material that prevents said selected area from being activated; and
    applying a second light energy through a second filter to activate the second energy sensitive material that is not masked,
    wherein the selected area is over a lead-in area of the optical storage device.

2. The method according to claim 1, wherein said first light energy comprises light energy emitted from a light source.

3. The method according to claim 1, wherein said first filter transmits light energy in the visible spectrum.

4. The method according to claim 3, wherein said first filter blocks at least a portion of light energy in the ultraviolet spectrum.

5. The method according to claim 4, wherein said first filter blocks light energy in the infrared spectrum.

6. The method according to claim 1, wherein said first filter transmits light energy in a first range of wavelengths while blocking light energy at wavelengths outside said first range of wavelengths.

7. The method according to claim 6, wherein said first range of wavelengths comprises about 325 nm to 500 nm.

8. The method according to claim 1, wherein said second energy sensitive material is activated by light energy at ultraviolet wavelengths outside a range of wavelengths blocked by said first filter.

9. The method according to claim 1, wherein said second filter blocks light energy at infrared wavelengths.

10. The method according to claim 1, wherein said first and second energy sensitive materials are on an optical disc when said first light energy is applied to cure said first energy sensitive material.

11. A method of manufacturing an optical storage device that can be incrementally activated, the method comprising:
applying first and second light energy sensitive materials having different properties to a surface of the optical storage device;
applying a first light energy through a first filter to cure the first energy sensitive material while blocking light energy that would activate the second energy sensitive material;
masking at least portions of a selected area of said second energy sensitive material that prevents said selected area from being activated;
applying a second light energy through a second filter to activate the second energy sensitive material that is not masked,
wherein the selected area is over a lead-in area of the optical storage device and
wherein said first and second energy sensitive materials are on a bulk sheet material when said first energy is applied to cure said first energy sensitive material; and
separating a disc-shaped section from said bulk sheet material and applying said disc-shaped section to a disc substrate.

12. The method according to claim 11, further comprising applying a second light energy to activate the second energy sensitive material after said disc-shaped section is applied to said disc substrate.

13. The method according to claim 12, further comprising masking a selected area of said second energy sensitive material while applying said second light energy to prevent said selected area from being activated.

14. The method according to claim 11, further comprising applying electro-optical components to said bulk sheet material before said material is applied to a disc substrate.

15. A method of incrementally activating an optical storage device, comprising:
applying first and second energy sensitive materials having different properties to a surface of the optical storage device;
applying a first light energy through a first filter to cure the first energy sensitive material while blocking light energy that would activate the second energy sensitive material, said first filter transmitting light energy in a first range of wavelengths while blocking light energy at wavelengths outside said first range of wavelengths;
masking with a mask bearing a textual masking pattern at least portions of a selected area of said second energy sensitive material that prevents said selected area from being activated; and
subsequently applying a second light energy through a second filter to activate the second energy sensitive material that is not masked, said second light energy comprising light energy at wavelengths outside said first range of wavelengths,
wherein the selected area is over a lead-in area of the optical storage device.

16. The method according to claim 15, wherein said second light energy comprises light energy in the ultraviolet spectrum.

17. A method for making an optical disc, comprising:
covering a lead-in portion of the optical disc punched from an optical material, which includes a mixture applied to an optical material surface of the optical material of an activation material and a protective material that was cured by a light within a wavelength range of 325 nm to 500 nm filtered from a light energy, with a circular ring-shaped mask that bears a textual masking pattern; and
applying a UV light with a wavelength below 300 nm to the portions of the activation material not covered by the circular ring-shaped mask to form textual images relative to the masking pattern.

18. A method for preparing an optical storage device, comprising:
applying a mixture to an optical material surface of an optical storage material of a protective material and an activation material, wherein the activation material is configured for activating with UV light with a wavelength below 300 nm when a circular ring-shaped mask that bears a textual masking pattern covers a lead-in portion of the optical disc punched from the optical storage material;
curing the protective material with a light energy that is filtered to transmit a light within a wavelength range of 325 nm to 500 nm; and
activating portions of the activation material not covered by the circular ring-shaped mask to form textual images relative to the masking pattern.

* * * * *

UNITED STATES PATENT AND TRADEMARK OFFICE
CERTIFICATE OF CORRECTION

Page 1 of 1

PATENT NO. : 8,383,326 B2
APPLICATION NO. : 11/716712
DATED : February 26, 2013
INVENTOR(S) : Anthony C. New It is certified that error appears in the above-identified patent and that said Letters Patent is hereby corrected as shown below:

<u>On the Title Page</u>

In the References Cited (56), please insert -- U.S. Patent Application No. 2002/0093901 to Davies et al. -- and -- European Patent No. 1237155 A1 to Matsushita Electric Industrial Co., Ltd. --.

<u>In the Specification</u>

At column 1, lines 11-12, please replace "U.S. Pat. No. 8,285,481" with -- U.S. Pat. No. 8,258,481 -- so that the corresponding phrase reads -- now U.S. Pat. No. 8,258,481, --.

At column 6, line 21, please replace "20'" with -- 20 -- so that the corresponding phrase reads -- the optical device 20 --.

Signed and Sealed this
Thirteenth Day of August, 2013

Teresa Stanek Rea
*Acting Director of the United States Patent and Trademark Office*